(12) United States Patent  
Pereira et al.

(10) Patent No.: US 8,761,538 B2
(45) Date of Patent: Jun. 24, 2014

(54) MEASUREMENT-BASED AND SCALABLE DEBLOCK FILTERING OF IMAGE DATA

(75) Inventors: Rochelle Pereira, Sunnyvale, CA (US); Santanu Dutta, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1111 days.

(21) Appl. No.: 12/332,240

(22) Filed: Dec. 10, 2008

(65) Prior Publication Data

US 2010/0142844 A1    Jun. 10, 2010

(51) Int. Cl.
G06K 9/40 (2006.01)
H04N 1/32 (2006.01)
H04N 1/41 (2006.01)

(52) U.S. Cl.
USPC ..................... 382/268; 358/426.01

(58) Field of Classification Search
None
See application file for complete search history.

(56) References Cited

U.S. PATENT DOCUMENTS

| | | |
|---|---|---|
| 6,907,079 B2 | 6/2005 | Gomila et al. |
| 6,917,310 B2 | 7/2005 | Pearson et al. |
| 7,372,905 B2 | 5/2008 | Foo et al. |
| 7,421,025 B2 | 9/2008 | Wang et al. |
| 7,590,059 B2 | 9/2009 | Gordon |
| 7,796,692 B1 | 9/2010 | Falardeau et al. |
| 7,796,792 B2 | 9/2010 | Behiels |
| 8,116,379 B2 | 2/2012 | Dang |
| 2006/0078052 A1 | 4/2006 | Dang |
| 2006/0115002 A1 | 6/2006 | Kim et al. |
| 2006/0285757 A1* | 12/2006 | Abe et al. ...................... 382/236 |
| 2008/0056350 A1 | 3/2008 | Lyashevsky et al. |
| 2008/0101718 A1 | 5/2008 | Yang et al. |
| 2008/0123750 A1 | 5/2008 | Bronstein et al. |
| 2008/0159407 A1 | 7/2008 | Yang et al. |
| 2008/0240253 A1 | 10/2008 | Au et al. |
| 2008/0298473 A1 | 12/2008 | Gou |
| 2009/0003447 A1 | 1/2009 | Christoffersen et al. |
| 2009/0010326 A1 | 1/2009 | Rossholm et al. |
| 2009/0016430 A1 | 1/2009 | Schmit et al. |
| 2009/0129478 A1 | 5/2009 | Meroth |
| 2009/0304085 A1 | 12/2009 | Avadhanam et al. |
| 2012/0189067 A1* | 7/2012 | Dang ...................... 375/240.29 |

FOREIGN PATENT DOCUMENTS

| | | |
|---|---|---|
| JP | 11205792 | 7/1999 |
| JP | 2002501691 | 1/2002 |
| JP | 2006174138 | 6/2006 |
| JP | 2007251881 | 9/2007 |
| JP | 2008533863 | 8/2008 |

(Continued)

OTHER PUBLICATIONS

"An Adaptive Deblocking Filter for ROI-Based Scalable Video Coding" by Zhongkang Lu et al., IEEE Multimedia and Expo, pp. 1347-1350 (Jul. 2007).

Chen et al., "Architecture Design of H.264/AVC Decoder With Hybrid Task Pipelining for High Definition Videos", 2005.

(Continued)

Primary Examiner — Randolph I Chu

(57) ABSTRACT

In a deblocking operation, pixel values within a first block of pixels are compared, and pixel values in the first block are also compared to pixel values in a second block of pixels that is adjacent to the first block. Based on the results of the comparisons, a digital deblocking filter and a region of interest can be selected, where the region of interest identifies a number of pixels in the first block and a number of pixels in the second block to which the selected filter is to be applied.

14 Claims, 5 Drawing Sheets

(56) References Cited

FOREIGN PATENT DOCUMENTS

| | | |
|---|---|---|
| KR | 20020053336 | 5/2002 |
| KR | 1020000082892 | 7/2002 |
| TW | 200643825 | 12/2006 |
| WO | 2006013854 | 2/2006 |

OTHER PUBLICATIONS

Cheng et al. "An In-Place Architecture for the Deblocking Filter in H.264/AVC", pp. 530-535, Jul. 2007.
Huang et al., "Architecture Design for Deblocking Filter in H.264/JVT/AVC", 2003.
Schoffmann, et al., "An Evaluation of Parallelization Concepts for Baseline-Profile Compliant H.264/AVC Decoders", 2007.

* cited by examiner

MEASUREMENT-BASED AND SCALABLE DEBLOCK FILTERING OF IMAGE DATA

FIELD

Embodiments according to the present invention generally relate to data processing, in particular to video decoding and deblocking.

BACKGROUND

A video includes a series of pictures (or frames), with each frame consisting of a two-dimensional array of pixels. The pixels are divided into blocks (e.g., an 8×8 array of pixels). The video can be encoded (compressed) to reduce overall bit rate so that the video can be more efficiently transmitted to another device, where it can be decoded (decompressed), reconstructed and displayed.

Current video and image compression techniques include lossy processes like perceptual quantization of block transform coefficients. Lossy encoding of independent blocks within a video frame can lead to abrupt transitions, known as blocking artifacts, at block edges in the decoded and reconstructed image, giving the rendered image a relatively blocky appearance.

To eliminate or reduce the appearance of blocking artifacts, decoding devices perform a deblocking operation. In deblocking, a deblock filter (e.g., a low pass digital filter) is applied across block boundaries in order to smooth the transition between adjacent blocks, thereby improving the perceived quality of the displayed video.

However, selecting the proper strength deblock filter can be problematic. If the selected filter is too weak, then it may not effectively reduce the appearance of blocking artifacts. On the other hand, if the selected filter is too strong, it may result in the removal of too much detail.

Selecting the number of pixels to apply the deblock filter to can also be problematic. At one extreme, if the filter is applied only to the pixels immediately next to the block boundaries, then blocking artifacts may not be effectively reduced or eliminated. At the other extreme, if the filter is applied across all of the pixels in a block, then some pixel values may be unnecessarily modified and details inside the block may be lost.

SUMMARY

Thus, it is important to be able to select a deblock filter that can strike an acceptable balance between the need to reduce or eliminate blocking artifacts and the need to maintain a satisfactory level of detail. It is also important to be able to determine the number of pixels to which the selected deblock filter is to be applied to avoid over-filtering of the image data and the attendant loss of image details.

According to embodiments of the invention, for deblocking, pixel values within a first block of pixels are compared, and pixel values in the first block are also compared to pixel values in a second block of pixels that is adjacent to the first block. Based on the results of the comparisons, a digital deblocking filter and a "region of interest" can be selected, where the region of interest identifies a number of pixels in the first block and a number of pixels in the second block to which the selected filter is to be applied.

More specifically, in one embodiment, a first value is calculated for a first block of pixels, and a second value is calculated for a second block of pixels, where the second block is adjacent to the first block. In one embodiment, the first value is based on an "artifact count" for the first block and also on the "activity" within the first block. The artifact count provides a measure of the number of blocking artifacts associated with the first block. The activity provides a measure of the amount of variation with the first block; more specifically, activity provides a measure of the amount of deviation of selected pixel values from an intermediate value, such as the mean or weighted mean of the selected pixel values. In a similar fashion, the second value is based on an artifact count for the second block and also on the activity within the second block. In such an embodiment, the first value and the second value are each proportional to the artifact count and inversely proportional to the activity within the first block and the second block, respectively.

In one embodiment, the artifact count is determined by calculating the differences in pixel values across the boundary between the first and second blocks, and comparing those differences to two threshold values. The use of two thresholds provides a more accurate accounting of the visual sensitivity of the artifacts, which facilitates the selection of a deblock filter of the proper strength. In one such embodiment, the user (e.g., a viewer) selects at least one of the threshold values based on their individual preferences.

In one embodiment, one of the aforementioned first and second values is used as an index to select a digital deblock filter from among a bank of filters in which the filters gradually increase in strength as the value of the index increases. In one such embodiment, the minimum of the first and second values is used to select a deblock filter. The use of a filter bank with filters of different intensities eliminates the drawbacks associated with fixed filtering and with hard switching between filtering decisions. Furthermore, the number of filters in the filter bank can be specified depending on the type of graphics processing unit (GPU) being used to implement the invention. For example, fewer filters with fewer taps can be selected for use with a lower end or baseline GPU. In general, the overall complexity of filtering can be scaled to support different implementations that have different levels of computational processing power.

The selected deblock filter can then be applied across the boundary between the first and second blocks, to a certain number of pixels on one side of the boundary and to a certain number of pixels on the other side of the boundary, in order to generate new pixel values for the first and second blocks that smooth the transition across the block boundary. More specifically, the selected deblock filter is applied to a first number of pixel values in the first block and a second number of pixel values in the second block. In one embodiment, the first number of pixel values corresponds to the aforementioned first value, and the second number of pixel values corresponds to the aforementioned second value. Thus, the first and second values can be used to both select a deblock filter and define a region of interest.

In summary, according to embodiments of the invention, deblock filtering is adaptive (e.g., to the quality of the pixel values, as measured by the artifact count and activity per block), scalable (e.g., to the capabilities of the graphics card), and user-controlled. Embodiments according to the invention are not only well suited to a wide range of processing capabilities but also to a wide range of video qualities and applications, such as the enhancement of low bit rate video (e.g., Internet video).

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

Figure 1:
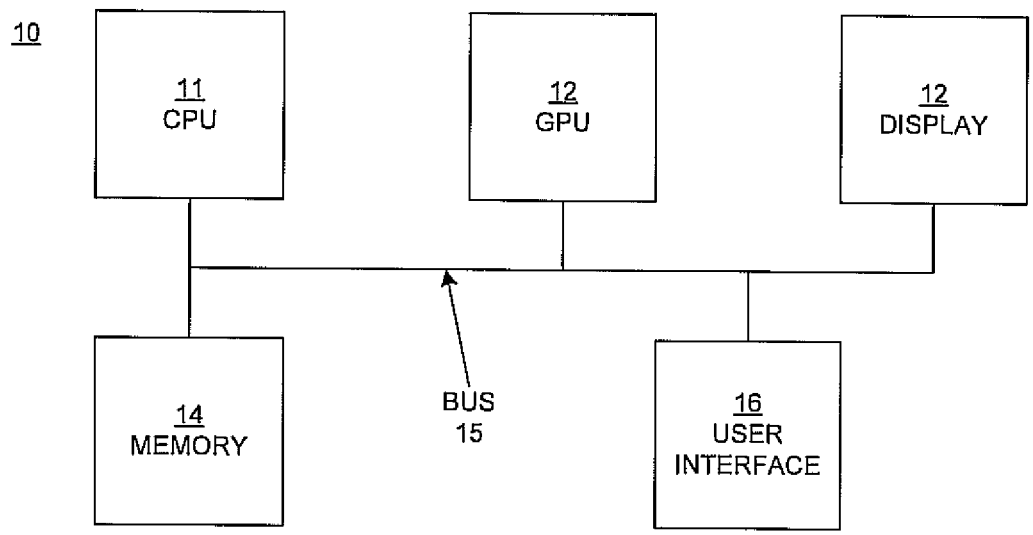
FIG. 1 is a block diagram of an example of a system upon which a decoder in accordance with embodiments of the invention can be implemented.

Reference will now be made in detail to embodiments in accordance with the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "encoding," "decoding," "deblocking," "receiving," "sending," "using," "applying," "calculating," "incrementing," "comparing," "selecting," "summing," "weighting," "computing," "accessing" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 3:
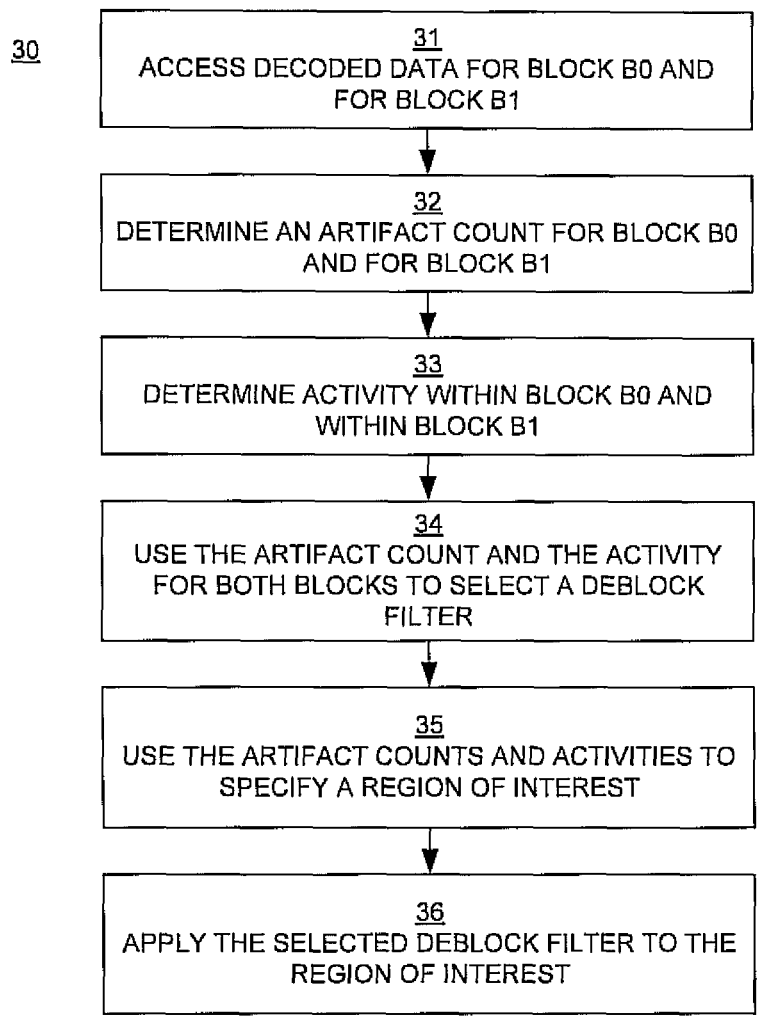
FIG. 3 is a flowchart of a computer-implemented method for deblocking image data according to an embodiment of the invention.
Figure 8:
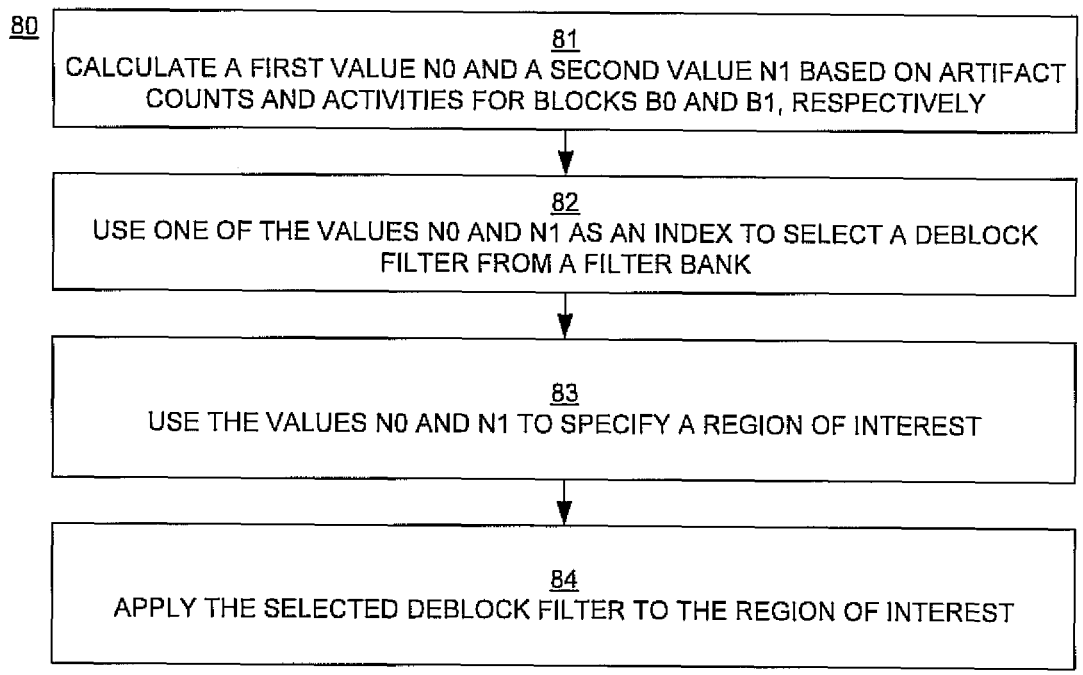
FIG. 8 is a flowchart of an example of a computer-implemented method for processing image data according to an embodiment of the invention.

FIGS. 3 and 8 are flowcharts of examples of computer-implemented methods for processing data according to embodiments of the present invention. Although specific steps are disclosed in the flowcharts, such steps are exemplary. That is, embodiments of the present invention are well-suited to performing various other steps or variations of the steps recited in the flowcharts.

The flowcharts of FIGS. 3 and 8 can be implemented as computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

In the discussion that follows, unless otherwise noted, a "decoder" refers to an element (e.g., a stand-alone or peripheral device, or an integrated system) that performs both decoding and deblocking. "Decoding," unless otherwise noted, refers to basic decoding operations (e.g., variable length decoding, inverse quantization, inverse transform, and motion compensation), while "deblocking" refers to the application of a deblock filter to decoding results. A "block" refers to an array (e.g., an N×N array) of pixels. The term "pixel" refers to a location in two-dimensional screen space, while the term "pixel value" refers to the data (e.g., luma value, chroma values, and the like) associated with a pixel.

FIG. 1 is a block diagram of an example of a system 10 upon which a decoder in accordance with the present invention can be implemented. In the example of FIG. 1, the system includes a host central processing unit (CPU) 11 coupled to a graphics processing unit (GPU) 12 via a bus 15. The GPU may also be referred to as a media processing unit (MPU).

Both the CPU and the GPU are coupled to a memory 14. In the example of FIG. 1, the memory is a shared memory, whereby the memory stores instructions and data for both the CPU and the GPU. Alternatively, there may be separate memories dedicated to the CPU and GPU, respectively. The memory can also include a video frame buffer for storing pixel data that drives a coupled display (screen) 13.

The system 10 also includes a user interface 16 that, in one implementation, includes an on-screen cursor control device. The user interface may include a keyboard, a mouse, and/or a touch screen device (a touchpad).

Generally speaking, the system 10 includes the basic components of a computer system platform that implements functionality in accordance with embodiments of the present invention. The system 10 can be implemented as, for example, any of a number of different types of computer systems (e.g., servers, laptops, desktops and notebooks), as well as a home entertainment system (e.g., a DVD player) such as a set-top box or digital television, or a portable or handheld electronic device (e.g., a portable phone, personal digital assistant, or handheld gaming device).

Figure 2:
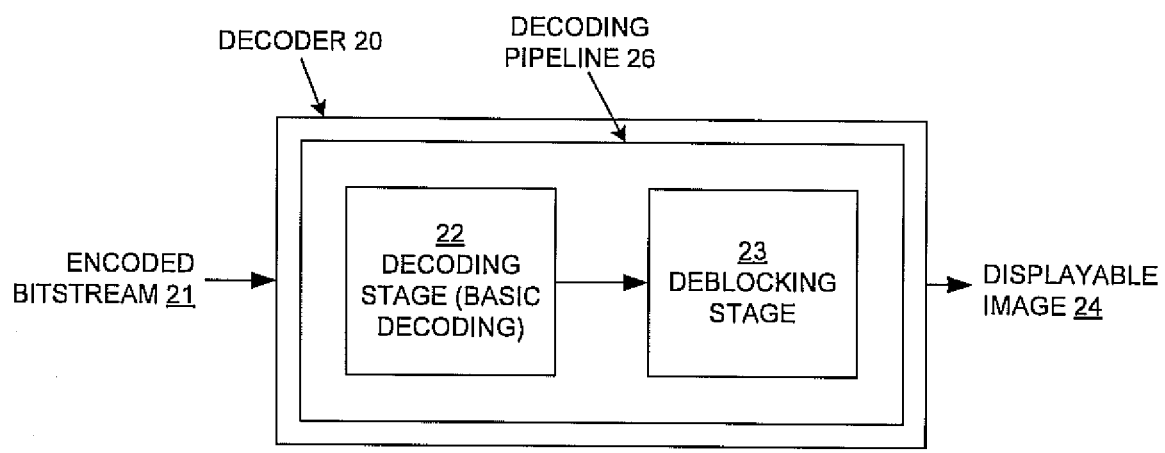
FIG. 2 is a block diagram showing elements of an example of a decoding and post-processing pipeline according to one embodiment of the invention.

FIG. 2 is a block diagram showing elements of a decoder 20 according to one embodiment of the present invention. In general, the decoder receives an encoded bitstream 21, decodes the data in the bitstream, and produces displayable image data 24.

In one embodiment, raw image data (e.g., video data) is compressed (encoded) using a compression scheme such as H.264, also known as Moving Pictures Experts Group-4 (MPEG-4) Part 10 or MPEG-4 Advanced Video Coding (AVC). Accordingly, a set of encoding parameters—such as, but not limited to, frame type (e.g., intra-coded I-frame, predicted P-frame or bi-predicted B-frame), macroblock prediction mode (e.g., inter-block versus intra-block), transform (e.g., discrete cosine transform) coefficients, texture coefficients, and motion vector information—are generated. The encoding parameters are then translated into variable length codes (VLCs), using Huffman coding for example. The encoded bitstream is a serialized bitstream containing the VLCs.

The decoder essentially reverses the encoding process to reconstruct the image data. In the example of FIG. 2, the decoder includes a decoding pipeline 26 that includes a decoding stage 22 and a deblocking stage 23.

The decoding stage performs basic decoding (decompression) operations such as variable length decoding, inverse quantization, inverse transform, and motion compensation. In general, the decoding stage parses the encoded bitstream to extract the VLCs, and then translates the VLCs to reproduce the encoding parameters referred to above. The encoding parameters are in turn used to reconstruct the original video data (more specifically, a version of the original video data is constructed).

In the deblocking stage, a digital deblock filter is applied to decoded blocks in order to smooth the boundaries between adjacent blocks when the reconstructed image is rendered (displayed). In the example of FIG. 2, the deblocking stage is independent of the type of decoding performed in the decoding stage and, as such, can be classified as an out-of-loop deblocker.

FIG. 3 is a flowchart 30 that provides an overview of a computer-implemented deblocking method according to an embodiment of the invention. In step 31, with reference also to FIG. 4, decoded data (pixel values) for a first block B0 and for a second block B1 is accessed. In one embodiment, only the luma plane is used for the deblocking method about to be described, in order to reduce the number and complexity of computations. Subjective testing indicates that, with respect to the perception of blocking artifacts, chroma values are not as significant as luma values and so luma values alone can be used to establish the intensity of deblock filtering. However, the present invention is not limited to the use of only luma values.

In step 32 of FIG. 3, an "artifact count" is determined for each of the blocks B0 and B1. Generally speaking, the artifact count is a measure of the number of blocking artifacts associated with each block. Additional information is provided in conjunction with the discussion of FIG. 4.

In step 33 of FIG. 3, the "activity" is determined for each of the blocks B0 and B1. Generally speaking, the activity is a measure of the deviation in pixel values within a block. Additional information is provided in conjunction with the discussion of FIGS. 6A and 6B.

In step 34 of FIG. 3, the artifact count and activity for both blocks are used together to select a deblock filter from a filter bank. More specifically, in one embodiment, a first value N0 is calculated for the first block based on the artifact count and activity for the first block, and a second value N1 is similarly calculated for the second block. The values of N0 and N1 are used to set an index value N, which in turn is used to select a deblock filter from the filter bank. Additional information is provided in conjunction with the discussion of FIG. 7.

In step 35 of FIG. 3, the artifact count and activity are also used as the basis for selecting the number of pixel values in the blocks B0 and B1 to which the selected deblock filter is to be applied. More specifically, in one embodiment, the values of N0 and N1 are used to specify a "region of interest" that extends across the boundary of the blocks B0 and B1 and that defines the number of pixels to which the selected deblock filter is to be applied. Additional information is provided in conjunction with the discussion of FIG. 7.

In step 36 of FIG. 3, the selected deblock filter is applied across the boundary between the blocks B0 and B1 to the region of interest. That is, the selected deblock filter is applied to the specified number of pixel values in block B0 and the specified number of pixel values in block B1, to generate a corresponding number of new (modified) pixel values in each of the blocks. Additional information is provided in conjunction with the discussion of FIG. 7.

In one embodiment, the methodology just described is applied to the horizontal and vertical boundaries of all the blocks in an image frame in two passes—a horizontal pass in which the vertical boundaries are processed, and a vertical pass in which the horizontal boundaries are processed. The two passes are performed sequentially, in which case the results of the first pass (the modified pixel values) are stored and used as inputs for the second pass.

Artifact Count

Figure 4:
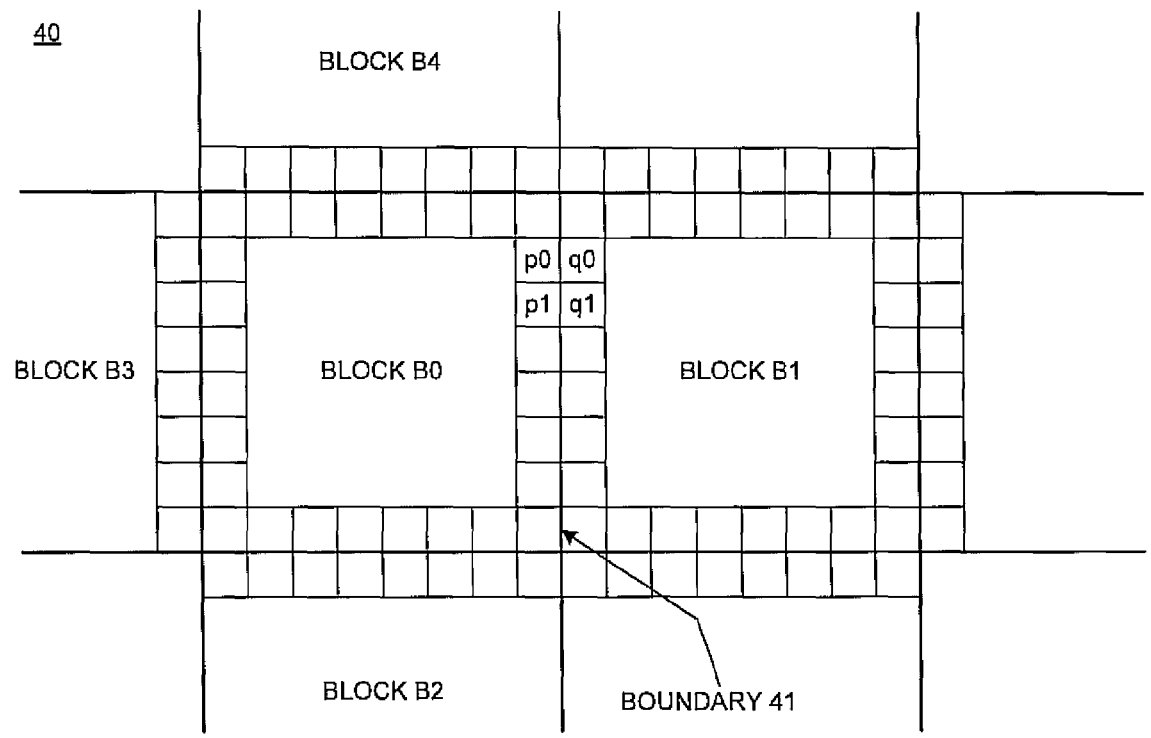
FIG. 4 illustrates an example of an array of blocks in an image frame according to an embodiment of the invention.

With reference now to FIG. 4, an image frame 40 includes an array of blocks, including the blocks B0 and B1. The frame 40 may be one frame in a sequence of such frames, as in a video.

Only eight (8) blocks are represented in FIG. 4; in actual practice, an image frame can include many such blocks. The blocks B0 and B1 are adjacent to one another; that is, the blocks B0 and B1 share an edge or boundary 41. In addition to block B1, there are a number of other blocks adjacent to block B0; similarly, in addition to block B0, there are a number of other blocks adjacent to block B1.

In the example of FIG. 4, each block includes an array of 8×8 pixels. However, the present invention is not so limited, and can be utilized with other block sizes. Note that, for the purposes of the discussion herein, block boundaries are defined as falling between pixels. Not all of the pixels are illustrated in FIG. 4; only the pixels adjacent to the boundaries of blocks B0 and B1 are shown.

As mentioned above, according to an embodiment of the invention, an artifact count is determined for each of the blocks in the image frame. Generally speaking, an artifact count for a block is determined by thresholding the differences between selected pixel values (e.g., luma values) across the boundary between that block and the adjacent blocks (the four blocks that share an edge with the block of interest). Measurements for each block are performed across all four of the block's boundaries. The artifact count per block is stored and subsequently used, along with an activity measure, to select a deblock filter and the number of pixels the filter will be applied to.

More specifically, in one embodiment, the pixel values for pairs of adjacent pixels are subtracted, where each pair consists of one pixel on one side of a block boundary and the immediately adjacent pixel on the other side of the block boundary. Using blocks B0 and B1 as examples, the pixel value for pixel p0 and the pixel value for pixel q0 are subtracted. Similarly, the pixel value for pixel p1 and the pixel value for pixel q1 are subtracted, and so on all the way around each of the four edges of block B0. That is, the artifact count for block B0 is based on the difference in pixel values across the boundary between block B0 and block B1, the boundary between block B0 and block B2, the boundary between block B0 and block B3, and the boundary between block B0 and block B4.

This process is repeated for each pixel along each of the four edges of block B1 and, ultimately, for each block in the frame. The absolute value of the difference between two pixel values is used so that the difference is always a positive number.

Thus, for any block BN:

$$\text{diff}(BN, i) = |[\text{pixel value for } p(i)] - [\text{pixel value for } q(i)]|; \quad (1)$$

where pixel p(i) is located at the edge of the block BN and q(i) is the pixel across the block boundary from, but immediately adjacent to, the pixel p(i). Pixel values for corner pixels are used twice, once in the horizontal pass and once in the vertical pass. Thus, in the example of FIG. 4, i=1, 2, . . . , 32.

Figure 5:
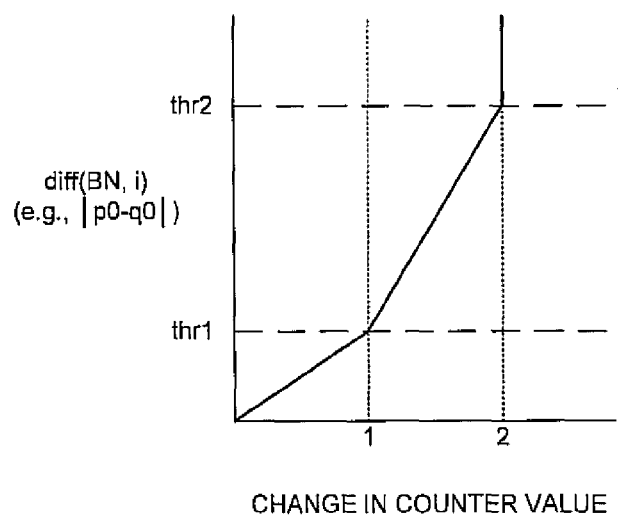
FIG. 5 illustrates thresholds used to count blocking artifacts according to an embodiment of the invention.

In one embodiment, with reference to FIG. 5, each of the differences diff(BN, i) is then compared to both a first threshold thr1 and a second threshold thr2, where the second threshold is greater than the first threshold. In one such embodiment, the second threshold is a constant multiple of the first threshold: thr2=n*thr1, where n>1. As such, if the first threshold is increased, then the second threshold is also increased. Because of the relationship between the first threshold and the second threshold, the range between the first and second thresholds increases if the first threshold is increased.

A counter is associated with each of the blocks; for example, a first counter is associated with block B0, and a second counter is associated with block B1. In the example of FIG. 5, for each value of 'i,' if the value of diff(BN, i) is greater than or equal to the first threshold thr1, then the counter associated with the block BN is incremented (e.g., increased by a value of one). If the value of diff(BN, i) is less than the first threshold thr1, then the counter associated with the block BN is increased by the ratio of diff(BN, i) to thr1. If the value of diff(BN, i) is greater than or equal to the second threshold thr2, then the counter associated with the block BN is incremented again (e.g., increased by another value of one). If the value of diff(BN, i) is less than the second threshold thr2 but greater than the first threshold thr1, then the counter associated with the block BN is increased by the ratio of diff(BN, i) to thr2. Note that, in the present embodiment, the counter value is not increased by more than two increments even if the second threshold thr2 is exceeded.

Thus, for block B0, for example:

$$\text{Artifact\_count}(B0, i) = \min(1, [\text{diff}(B0, i)/\text{thr1}]) + \min(1, [\text{diff}(B0, i)/\text{thr2}]); \quad (2)$$

$$\text{Artifact\_count\_}B0 = \Sigma(\text{Artifact\_count}(B0, i)); \quad (3)$$

where Artifact_count(B0, i) is the amount that the counter value for block B0 is increased for each value of diff(B0, i), and Artifact_count_B0 is the final value of the counter for block B0. In this manner, an artifact count is accumulated for block B0 and, in a similar manner, an artifact count is accumulated for block B1 and for each block in the frame.

Two distinct thresholds are used to better account for visual sensitivity to the blocking artifact. If, for example, the difference in pixel values across a block boundary is significantly large and if the area surrounding that block boundary has relatively low frequency content (low activity), then the artifact would be more visually distracting. In such a situation, the block edge at that boundary would be better treated using a strong low pass filter with an increased length (e.g., more taps) in order to reduce the artifact by an acceptable degree. To help achieve this end, each difference large enough to exceed both thresholds doubles the incremental amount added to the counter value. If activity is low, this can translate into the selection of a strong filter with increased low pass filtering capability.

In one embodiment, the thresholds are under user control. That is, a user can specify, for example, the first threshold thr1; because the second threshold thr2 is a multiple of the first threshold, the second threshold is also, in a sense, a user-controlled value. The filter strength can be increased by reducing the threshold thr1, or vice versa. Thus, a user can help to establish the intensity of the deblock filtering based on, for example, his/her personal preferences or the display capabilities of the user's device. Because out-of-loop deblocking is independent of decoding, the same instance of decoded content can be filtered one way for a larger screen size or higher resolution display, and another way for a smaller screen size or lower resolution display.

In one implementation, the user is presented with a graphical user interface (GUI) such as a slider that the user can position within a range of arbitrary values (e.g., from zero to 100). As such, the user is not necessarily selecting a particular deblock filter, but instead is selecting a setting that corresponds to an image quality that is satisfactory to the user, which in turn is mapped to the deblock filter that will yield the desired image quality. Thus, the GUI is independent of the number of filters in the filter bank, facilitating the scalability of the invention to different types of GPUs.

Calculation of Activity

Figure 6A:
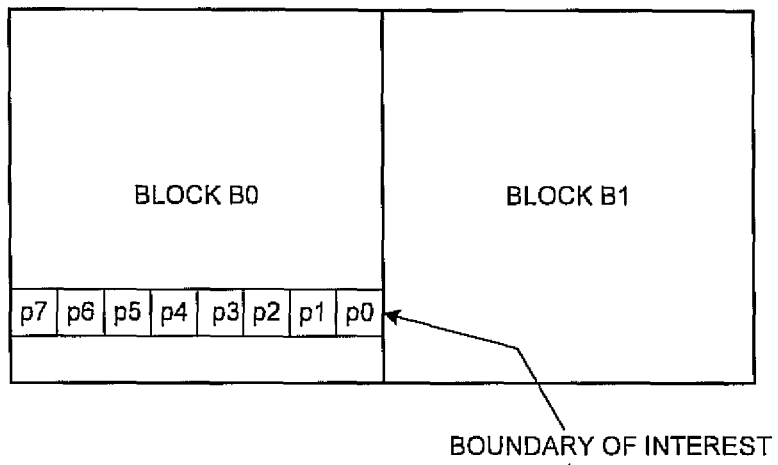
FIG. 6A illustrates an example of a row of pixels in a block according to an embodiment of the invention.
Figure 6B:
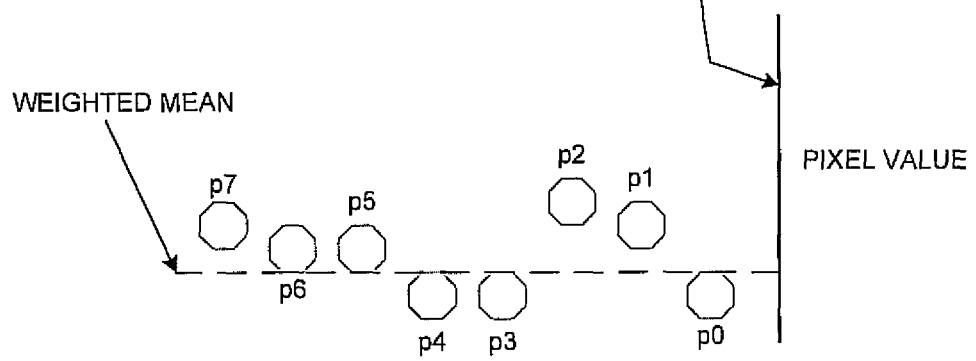
FIG. 6B illustrates an example of a distribution of pixel values according to an embodiment of the invention.

FIG. 6A illustrates the two adjacent blocks B0 and B1 and a row of pixels p0, p1, . . . , p7 in block B0, while FIG. 6B illustrates an example of the relative value of those pixels. While these examples depict 8 pixels per row, the present invention is not so limited.

As mentioned above, according to an embodiment of the invention, a measure of activity is determined for each of the blocks. More specifically, in one embodiment, a measure of activity is determined for each row of each block and for each column of each block.

In general, activity is determined as a function of the deviation of selected pixel values from an intermediate value that is derived from the selected pixel values. Specifically, in one embodiment, the intermediate value is a weighted mean of the selected pixel values. In one such embodiment, the differences between each of the selected pixel values and the weighted mean are also weighted. Thus, in one embodiment, activity is determined as a weighted function of the deviation of selected pixel values from the weighted mean of the selected pixel values.

As mentioned above, deblock filtering is accomplished using two passes—a horizontal pass and a vertical pass. During the horizontal pass, each row of pixels is processed; that is, the selected pixel values referred to above correspond to a row of pixels. During the vertical pass, each column of pixels is processed; that is, the selected pixel values referred to above correspond to a column of pixels.

In one embodiment, the weighted mean (WM) of the pixels $p0, p1, \ldots, p7$ is determined as follows:

$$WM = (w0*p0 + w1*p1 + \ldots + w7*p7) >> 5; \quad (4)$$

where $w0, w1, \ldots, w7$ are weights chosen such that $w0 > w1 > \ldots > w7$ and $w0 + w1 + \ldots + w7 = 32$ and where, for simplicity of expression, $p0, p1, \ldots, p7$ represent pixel values. In general, the weighting factor is larger the closer the pixel is to the boundary of interest. Thus, in the example of FIG. 6A, because pixel $p0$ is closer to the boundary between block B0 and block B1, it is weighted more than the other pixels, and so on.

In one embodiment, the activity associated with the pixels $p0, p1, \ldots, p7$ is determined as follows:

$$\text{Activity} = a*(p0-WM) + b*(p1-WM) + c*(p2-WM) + d* \\ (p3-WM) + e*(p4-WM) + f*(p5-WM) + g*(p6- \\ WM) + h*(p7-WM); \quad (5)$$

where $a, b, \ldots, h$ are fixed weights with $a > b > \ldots > h$. Similar to the above, the weighting factor is larger the closer the pixel is to the boundary of interest. In the present embodiment, the weights are used to suggest the decreasing relevance of the deviation from the weighted mean as the Manhattan distance of a pixel from the block boundary increases.

Selection of Filter and Region of Interest

To summarize to this point, according to the embodiments described above, an artifact count is determined for each block, and an activity is determined for each row and for each column of each block. This information can be used to select a deblock filter from a filter bank stored in memory and to identify the number of pixels that the selected filter is to be applied to (the region of interest).

In one embodiment, the artifact count per block and the activity per row or column is used to determine a first value N0 for each row and for each column of the first block (e.g., block B0) and a second value N1 for each row and for each column of the second block (e.g., block B1). For simplicity of discussion, the following description is for a single row of block B0 and the corresponding row of block B1.

Figure 7:
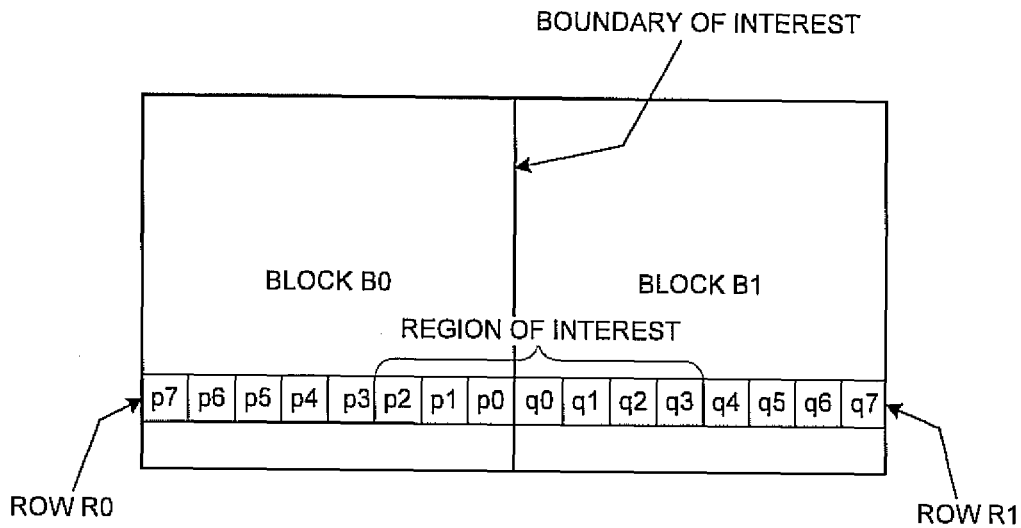
FIG. 7 illustrates an example of a region of interest according to an embodiment of the invention.

FIG. 7 illustrates a row R0 of block B0 and a corresponding row R1 of block B1; that is, the row R0 and the row R1 lie along the same horizontal line.

The first value N0 for the row R0 is determined as follows:

$$N0 = \exp(-[\text{Activity\_}R0]/[\text{Artifact\_count\_}B0]); \quad (6)$$

where Activity_R0 represents the activity associated with row R0 and Artifact_count_B0 represents the artifact count for block B0. Similarly, the second value N1 is determined as follows:

$$N1 = \exp(-[\text{Activity\_}R1]/[\text{Artifact\_count\_}B1]). \quad (7)$$

Note that the values N0 and N1 are proportional to the artifact count. On the other hand, the values N0 and N1 are inversely proportional to the activity across the block boundary.

According to embodiments of the invention, one of the values N0 and N1 is used to select a deblock filter from a bank of pre-selected filters. In one embodiment, the minimum of the values N0 and N1 is used to select a deblock filter from the filter bank. Using the minimum of N0 and N1 helps ensure the continued presence of image details. That is, by using the minimum of N0 and N1, the selected filter is weaker than the filter that would have been selected if the maximum value was used. Thus, in the present embodiment, image detail is given precedence over removing blocking artifacts. However, the maximum of N0 and N1 can be used instead if artifact removal is considered more important.

In one embodiment, the filter bank contains seven (7) filters of different intensities. The use of a filter bank with filters of different intensities eliminates the drawbacks associated with fixed filtering and with hard switching between filtering decisions.

In one implementation, the filter bank contains the following filters (H), where the index $N = 0, 1, \ldots, 6$.

TABLE 1

Example Filter Bank

| H[N] = | {0 | 0 | 0 | 0 | 128 | 0 | 0 | 0 | 0} |
|---|---|---|---|---|---|---|---|---|---|
| | {0 | 0 | 0 | 26 | 76 | 26 | 0 | 0 | 0} |
| | {0 | 0 | −5 | 42 | 54 | 42 | −5 | 0 | 0} |
| | {0 | 1 | 7 | 33 | 46 | 33 | 7 | 1 | 0} |
| | {−2 | 2 | 15 | 30 | 38 | 30 | 15 | 2 | −2} |
| | {8 | 8 | 16 | 16 | 32 | 16 | 16 | 8 | 8} |
| | {8 | 16 | 16 | 16 | 16 | 16 | 16 | 16 | 8} |

In the example above, the filters in the filter bank are ordered such that, as the value of the index N increases (as it will for higher artifact counts), the intensity of the filter increases. The filter coefficients in Table 1 are examples. Different filters with different specifications can be designed and used.

As noted above, the values N0 and N1 are proportional to the artifact count. With the use of two thresholds thr1 and thr2 as described above, the artifact count is doubly incremented when the differences between pixel values across block boundaries is relatively large. Hence, if only the artifact count is considered (that is, activity is neglected), then a higher artifact count would result in higher values of N0 and N1, which in turn would result in stronger low pass filtering that more effectively eliminates or reduces blocking artifacts. On the other hand, the values N0 and N1 are inversely proportional to the activity across the block boundary. Hence, if only activity is considered (that is, artifact count is neglected), then higher activity would result in lower values of N0 and N1, which in turn would result in weaker low pass filtering, helping to preserve the details in the areas adjacent to the block boundary.

In embodiment, the selected (e.g., minimum) value of N0 and N1 is rounded to the nearest whole number and used as the index N to select one of the filters: N=min(N0, N1). For example, if N0 and N1 are found to be three (3) and four (4), respectively, then N would be 3 and the following filter would be applied to the region of interest:

H[3]={0 1 7 33 46 33 7 1 0}.

The values of N0 and N1 are also used to define the region of interest (the number of pixels that the selected filter is applied to). In general, the selected filter is applied to N0 pixels in block B0 and to N1 pixels in block B1. Thus, in the above example, the filter H[3] would be applied to 3 pixels in block B0 and to 4 pixels in block B1, as shown in FIG. 7. Note that the region of interest can include a different number of pixels on either side of the block boundary, thus lending a significant degree of flexibility to the region of interest.

Embodiments in accordance with the invention are not limited to 7 filters in the filter bank. Fewer filters can be included in the filter bank to reduce computational complexity. Filters that utilize fewer taps than the example filters listed above can also be used. For example, fewer filters, perhaps with fewer taps, can be selected for use with lower end or baseline GPUs. In this manner, the overall complexity of filtering can be scaled to support different GPU implementations according to the processing power of the GPU.

The filter bank can also include more than 7 filters. The number of filters in the filter bank can be increased in implementations that do not use the same number N to select both the filter and the region of interest. For example, as previously described herein, the values of N0 and N1 can be rounded off to the nearest whole number for the purpose of defining the region of interest, but their actual values can be used to index a filter bank that contains more than 7 entries.

Note that the calculated values of N0 and N1 can be greater than the number of pixels in a row or column, and the value of N and the number of filters in the filter bank can also be greater than the number of pixels in a row or column. In such an implementation, to determine the size of the region of interest, the values of N0 and N1 can be constrained (e.g., scaled) to values that correspond to the number of pixels in a row or column; and to select a filter from the filter bank, the non-scaled values can be used, or if need be the values can be scaled using the same or a different scaling factor than that used to determine the size of the region of interest.

FIG. 8 is a flowchart 80 of an example of a computer-implemented method for processing data according to an embodiment of the invention. In step 81, a first value (N0) for a first block of pixels (block B0) and a second value (N1) for a second block of pixels (block B1) are calculated. The first value N0 is based on a measure of differences between selected pixel values for block B0 and selected pixel values for blocks adjacent to block B0, including block B1. In one embodiment, these differences are obtained by subtracting pixel values for pairs of adjacent pixels, each of the pairs associated with a pixel in block B0 and a neighboring pixel in an adjacent block (as in equation (1) above). In one such embodiment, a counter value associated with the block B0 is incremented for each of these differences that exceeds a first threshold (e.g., threshold thr1) and incremented again for each of these differences that exceeds a second threshold (e.g., threshold thr2). The counter value can also be increased by a commensurate amount if these differences are less than the first threshold or fall between the first and second thresholds (as in equation (2) above). Generally speaking, the first value N0 is based on the artifact count for block B0.

The first value N0 is also based on a measure of deviations in a subset of the pixel values (e.g., row R0) for block B0. In one embodiment, a weighted mean is calculated for the subset of pixel values (row R0), and the differences between each pixel value in the subset and the weighted mean is then determined. In one such embodiment, the differences between the pixel values and the weighted mean are also weighted (as in equation (5) above). Generally speaking, the first value N0 is also based on the activity within block B0.

The second value N1 is similarly based on the artifact count for block B1 and activity within block B1.

In step 82, one of the first and second values (N0 or N1) is used as an index (N) to select a digital deblock filter (H) from a filter bank (e.g., Table 1).

In step 83, the first and second values N0 and N1 are used to specify how many of the pixel values (e.g., how many pixels in row R0 of block B0 and in the corresponding row of block B1) to apply the selected deblock filter to. That is, the first and second values N0 and N1 are used to define a region of interest (as in the example of FIG. 7 above).

In step 84 of FIG. 8, the selected deblock filter is applied to pixel values in block B0 and pixel values in block B1 to generate new pixel values. That is, the selected deblock filter is applied to the region of interest to eliminate or reduce blocking artifacts.

In summary, according to embodiments of the invention, a deblock filter that strikes an acceptable balance between treating blocking artifacts and maintaining a satisfactory level of detail is selected. Furthermore, the number of pixels to which the selected deblock filter is to be applied can be appropriately determined in order to avoid over-filtering of image details. In addition, deblock filtering according to the invention is adaptive (e.g., to the quality of the pixel values, as measured by the artifact count and activity per block), scalable (e.g., to the capabilities of the graphics card), user-controlled, and well suited to a wide range of video qualities and applications, such as the enhancement of low bit rate video (e.g., Internet video).

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer-readable device having computer-executable instructions for performing a method of deblocking image data, the method comprising:

making a comparison of pixel values within a first block of pixels and also making a comparison of pixel values in the first block to pixel values in a second block of pixels that is adjacent to the first block;

based on results of the comparisons, selecting a digital deblock filter from a plurality of filters and also selecting a region of interest to which the deblock filter is to be applied, the region of interest comprising a first number of pixels in the first block and a second number of pixels in the second block, wherein the deblock filter is selected by:

calculating a first value for the first block of pixels and a second value for the second block of pixels, wherein the first value is based on a measure of differences between selected pixel values for the first block and selected pixel values for a first plurality of blocks adjacent to the first block and including the second block, the first value also based on a measure of deviations in a first plurality of pixel values for the first block, wherein further the second value is based on a measure of differences between selected pixel values for the second block and selected pixel values for a second plurality of blocks adjacent to the second block and including the first block, the second value also based on a measure of deviations in a second plurality of pixel values for the second block; and using one of the first and second values as an index to select the deblock filter from the plurality of filters; and applying the deblock filter to the region of interest to generate new pixel values for the first and second blocks.

2. The computer-readable device of claim 1 wherein the first number and the second number are based on the first value and the second value, respectively.

3. The computer-readable device of claim 1 wherein the method further comprises:
calculating the differences between the selected pixel values for the first block and the selected pixel values for the first plurality of blocks by subtracting pixel values for first pairs of adjacent pixels, each of the first pairs associated with a pixel in the first block and a pixel in the first plurality of blocks; and
calculating the differences between the selected pixel values in the second block and the selected pixel values in the second plurality of blocks by subtracting pixel values for second pairs of adjacent pixels, each of the second pairs associated with a pixel in the second block and a pixel in the second plurality of blocks.

4. The computer-readable device of claim 1 wherein the method further comprises:
incrementing a first counter value for each of the differences between the selected pixel values for the first block and the selected pixel values for the first plurality of blocks that exceeds a first threshold, and incrementing the first counter value again for each of the differences between the selected pixel values for the first block and the selected pixel values for the first plurality of blocks that exceeds both the first threshold and a second threshold, wherein the first value is based on the first counter value; and
incrementing a second counter value for each of the differences between the selected pixel values for the second block and the selected pixel values for the second plurality of blocks that exceeds the first threshold, and incrementing the second counter value again for each of the differences between the selected pixel values for the second block and the selected pixel values for the second plurality of blocks that exceeds both the first threshold and the second threshold, wherein the second value is based on the second counter value.

5. The computer-readable device of claim 4 wherein the first threshold is adjustable and user-defined, and wherein the second threshold is a constant multiple of the first threshold.

6. The computer-readable device of claim 1 wherein the method further comprises:
calculating a first weighted mean for the first plurality of pixel values;
calculating a second weighted mean for the second plurality of pixel values;
summing differences between the first plurality of pixel values and the first weighted mean to determine the deviations in the first plurality of pixel values; and
summing differences between the second plurality of pixel values and the second weighted mean to determine the deviations in the second plurality of pixel values.

7. The computer-readable device of claim 6 wherein the method further comprises:
weighting the differences between the first plurality of pixel values and the first weighted mean; and
weighting the differences between the second plurality of pixel values and the second weighted mean.

8. The computer-readable device of claim 1 wherein the first value is proportional to the differences between the selected pixel values for the first block and the selected pixel values for the first plurality of blocks and inversely proportional to the deviations in the first plurality of pixel values, wherein further the second value is proportional to the differences between the selected pixel values for the second block and the selected pixel values for the second plurality of blocks and inversely proportional to the deviations in the second plurality of pixel values.

9. The computer-readable device of claim 1 wherein the minimum of the first and second values is used as the index to select the deblock filter.

10. A system for decoding and deblocking image data, the system comprising:
a computer-readable memory that stores decoded image data comprising: a first block comprising pixels having first pixel values, and a second block adjacent to the first block and comprising pixels having second pixel values; and
a deblocker coupled to the memory that selects a digital deblock filter from a plurality of deblock filters and applies the deblock filter to a first number of the first pixel values and to a second number of the second pixel values, wherein the first number is based on differences between selected pixel values for the first block and selected pixel values for a first plurality of blocks including the second block, the first number also based on deviations among the first pixel values, wherein further the second number is based on differences between selected pixel values for the second block and selected pixel values for a second plurality of blocks including the first block, the second number also based on deviations among the second pixel values; and wherein the deblock filter is selected by indexing the plurality of filters with one of the first and second numbers.

11. The system of claim 10 wherein the deblocker is further operable for comparing each of the differences between the selected pixel values for the first block and the selected pixel values for the first plurality of blocks to a first threshold and to a second threshold and for incrementing a first counter value accordingly, wherein the first number is a function of the first counter value, wherein further the deblocker is also operable for comparing each of the differences between the selected pixel values for the second block and the selected pixel values for the second plurality of blocks to the first threshold and to the second threshold and for incrementing a second counter value accordingly, wherein the second number is a function of the second counter value.

12. The system of claim 11 further comprising a user interface coupled to the deblocker and operable for receiving a user input that defines the first threshold, wherein the second threshold is a constant multiple of the first threshold.

13. The system of claim 10 wherein the deblocker is further operable for calculating a first weighted mean for the first pixel values and then summing differences between the first pixel values and the first weighted mean to determine the deviations among the first pixel values, wherein further the deblocker is also operable for calculating a second weighted mean for the second pixel values and then summing differences between the second pixel values and the second weighted mean to determine the deviations among the second pixel values.

14. The system of claim 12 wherein the deblocker is further operable for weighting the differences between the first pixel values and the first weighted mean, wherein further the deblocker is also operable for weighting the differences between the second pixel values and the second weighted mean.

* * * * *